United States Patent [19]

Savins

[11] Patent Number: 4,720,348
[45] Date of Patent: * Jan. 19, 1988

[54] WATERFLOODING EMPLOYING THICKENED SURFACTANT SOLUTIONS

[75] Inventor: Joseph G. Savins, Dallas, Tex.

[73] Assignee: Mobil Oil Corporation, New York, N.Y.

[*] Notice: The portion of the term of this patent subsequent to Jan. 1, 1997 has been disclaimed.

[21] Appl. No.: 344,569

[22] Filed: Feb. 1, 1982

Related U.S. Application Data

[63] Continuation of Ser. No. 107,250, Dec. 26, 1979, abandoned, which is a continuation-in-part of Ser. No. 859,626, Dec. 12, 1977, Pat. No. 4,181,178.

[51] Int. Cl.$^4$ ............................................. E21B 43/22
[52] U.S. Cl. ................................... 252/8.554; 166/274
[58] Field of Search ............... 252/8.55 D, 8.55 R, 252/8.554, 8.551; 166/274, 273

[56] References Cited

U.S. PATENT DOCUMENTS

| | | | |
|---|---|---|---|
| 3,827,497 | 8/1974 | Dycus et al. | 166/274 |
| 3,888,308 | 6/1975 | Gale et al. | 252/8.55 |
| 3,977,471 | 8/1976 | Gale et al. | 252/8.55 X |
| 4,018,278 | 4/1977 | Shupe | 166/252 |
| 4,077,471 | 3/1978 | Shupe et al. | 252/8.55 X |
| 4,181,178 | 1/1980 | Savins | 252/8.55 |

OTHER PUBLICATIONS

Griffin, Article in *Journal of the Society of Cosmetic Chemists*, vol. 1, 1949, pp. 311-326.
Becher, *Emulsions: Theory and Practice*, Second Edition, 1965, Reinhold Pub. Co., New York, pp. 241-250.

*Primary Examiner*—Herbert B. Guynn
*Attorney, Agent, or Firm*—A. J. McKillop; M. G. Gilman; J. P. O'Sullivan, Sr.

[57] ABSTRACT

Waterflooding process for the recovery of oil from a subterranean formation in which at least a portion of the injected water is thickened by the addition of a mixture of sulfonated polyethoxylated aliphatic alcohol surfactants. The thickened water has a salinity within the range of 5-18 percent. The mixture of sulfonated polyethoxylated aliphatic alcohols has an HLB within the range of 10.0-14.0 and the lipophilic base of the surfactant mixture contains an average of from 16 to 20 carbon atoms. The surfactant mixture incareases the viscosity of the water to a value greater than viscosity achieved through the addition of only one of the surfactant components.

4 Claims, No Drawings

WATERFLOODING EMPLOYING THICKENED SURFACTANT SOLUTIONS

BACKGROUND OF THE INVENTION

This application is a continuation of application Ser. No. 107,250, filed Dec. 26, 1979, now abandoned, which is a continuation-in-part of U.S. patent application Ser. No. 859,626 filed Dec. 12, 1977, now U.S. Pat. No. 4,181,178.

This invention relates to the recovery of oil from subterranean oil reservoirs and more particularly to improved waterflooding operations involving the use of a viscous aqueous liquid formulated through the addition of mixtures of ether-linked sulfonate surfactants under controlled conditions of salinity.

In the recovery of oil from oil-bearing reservoirs, it usually is possible to recover only minor portions of the original oil in place by the so-called primary recovery methods which utilize only the natural forces present in the reservoir. Thus, a variety of supplemental recovery techniques has been employed in order to increase the recovery of oil from subterranean reservoirs. The most widely used supplemental recovery technique is waterflooding which involves the injection of water into the reservoir. As the water moves through the reservoir, it acts to displace oil therein to a production system composed of one or more wells through which the oil is recovered.

Various chemical additives may be employed in the injected water. For example, the injected water may contain surface-active agents which effect a reduction in the oil-water interfacial tension, thus enhancing the microscopic displacement of the oil by the water. Another widely used technique involves the addition of thickening agents which increase the viscosity of the injected water, normally to a value at least equal to that of the reservoir oil, in order to arrive at a favorable mobility ratio between the oil and water in order to increase the macroscopic displacement efficiency of the waterflood. Typically such viscosifiers or mobility control agents have taken the form of biopolymers such as the bacterial derived biopolymer available from the Kelco Company under the trade name "Kelzan" or synthetic polymers such as the partially hydrolyzed polyacrylamides available from the Dow Chemical Company under the trade name "Pusher" chemicals.

An alternative to the use of polymeric thickening agents involves the injection of a thickened aqueous surfactant solution as disclosed in U.S. Pat. No. 4,042,030 to Savins et al. In this process, at least a portion of the injected water is thickened through the use of an alkylaryl sulfonate in combination with a $C_4$–$C_6$ aliphatic alcohol having a hydrocarbon chain length of at least 3 carbon atoms. The aforementioned application Ser. No. 859,626 discloses a waterflooding process in which a thickened aqueous surfactant solution having a salinity within the range of 5–18 weight percent is formulated through the use of certain ether-linked sulfonates. These surfactants are sulfonated polyethoxylated aliphatic alcohols which have an HLB within the range of 10–14 and a hydrocarbon chain length of 16 to 20 carbon atoms.

SUMMARY OF THE INVENTION

In accordance with the present invention, there is provided a new and improved waterflooding process in which at least a portion of the injected fluid is an aqueous liquid which is thickened by employing a mixture of ether-linked sulfonate surfactants which have a synergistic thickening effect. The invention is carried out in a subterranean oil reservoir penetrated by a spaced injection and production system. The reservoir exhibits a temperature of at least 90° F. The viscous aqueous liquid introduced into the reservoir through the injection system has a salinity within the range of 5–18 weight percent and contains a mixture of at least two water-soluble sulfonated polyethoxylated aliphatic alcohols. The lipophilic bases of the surfactants have an average hydrocarbon chain length of from 16 to 20 carbon atoms and the ether linkages contain at least 2 ethylene oxide units. The surfactants have different HLB numbers and the resulting mixture has an average HLB within the range of 10.0–14.0. The mixture of these surfactants increases the viscosity of the aqueous liquid to a value in excess of the viscosity attained by adding either of the surfactants alone to the aqueous liquid. In a further embodiment of the invention the surfactant mixture has an average HLB within the range of 10–12.

DESCRIPTION OF SPECIFIC EMBODIMENTS

As disclosed in the aforementioned application, Ser. No. 859,626, certain ether-linked sulfonate surfactants act as viscosifiers for waterflood mobility control applications under certain conditions of salinity and reservoir temperature. The ether-linked sulfonates are employed in a brine having a salinity within the range of 5–18 weight percent. Within this salinity range a significant thickening effect may be achieved and the salinity may be varied within this range to arrive at a value at which maximum thickening occurs. The thickening effect of the surfactant systems is also temperature dependent and they are employed in reservoirs having temperatures of at least 90° F.

The ether-linked sulfonates employed as thickening agents are sulfonated ethoxylated aliphatic alcohols characterized by an HLB (hydrophilic-lipophilic balance) within the range of 10.0–14.0 and wherein the aliphatic hydrocarbon group forming the lipophilic base of the surfactant contains from 16 to 20 carbon atoms. The HLB is defined in accordance with the relationship.

$$HLB = 7 + \Sigma \text{ (hydrophilic group numbers)} - \Sigma \text{ (lipophilic group numbers)}$$

as described in Becher, Paul, EMULSIONS: THEORY AND PRACTICE, Second Edition, Reinhold Publishing Corportion, New York, USA, pp. 241–243. The sulfonate group is assigned a group number of 11.0 and the remaining group numbers are as set forth on page 242 of Becher. The ether linkage between the lipophilic base and the anionic sulfonate group contains 2 or more ethylene oxide units. The number of ethylene oxide units varies depending upon the nature of the lipophilic base to provide an HLB number within the aforementioned range of 10.0–14.0. Preferred surfactants disclosed in the aforementioned application, Ser. No. 859,626, have a lipophilic base containing from 16 to 18 carbon atoms and have HLB numbers within the range of 10.0–12.0.

The ether-linked sulfonates employed in the present invention are sulfonated polyethoxylated aliphatic alcohols of the type disclosed in the aforementioned parent application, Ser. No. 859,626, but are employed in a mixture to provide average values of the HLB and lipophilic base for the mixture within the ranges taught therein. Thus, the mixture of sulfonated polyethoxylated aliphatic alcohols employed in the present invention has an average HLB within the range of 10.0–14.0 and may be characterized by the formula:

$$R(OC_2H_4)_nOC_3H_6SO_3^-M^+ \quad (1)$$

wherein R is an aliphatic hydrocarabon group having an average of from 16 to 20 carbon atoms,
n is at least 2, and
M is an alkali metal, ammonium, or substituted ammonium ion.

Where M is an alkali metal ion, it usually will take the form of sodium or potassium. Substituted ammonium ions which may be employed include mono-, di-, or tri-substituted alkylammonium or alkanolammonium ions. Examples of alkylammoniumm ions include methylammonium, ethylammonium, and normal or iso-propylammonium ions and examples of alkanolammonium ions include monoethanolammonium and triethanolammonium ions. The viscosity of an aqueous solution of the surfactant mixture is greater than the viscosity produced by any one of the surfactant components alone in the same aqueous liquid under similar conditions of surfactant concentrations, salinity and temperature.

Experimental work relative to the present invention was carried out with a number of sodium salts of sulfonated polyethoxylated aliphatic alcohols added to saline solutions as single components and as mixtures. The surfactants are the same ones identified in application Ser. No. 859,626 as surfactants S-1 through S-8 and are similarly identified herein. For surfactants S-1 and S-2, R was a hexadecyl group and n had a value of 2 and 3, respectively, to provide HLB numbers of 10.9 and 11.3. Surfactants S-3 and S-4 were octadecyl polyethoxylated propane sulfonates having HLB numbers of 10.0 and 10.7, respectively. Surfactant S-3 contained about 2 ethylene oxide units and surfactant S-4 about 4 ethylene oxide units. In each of surfactants S-5 through S-7, R was a mixture of alkyl groups containing from about 12 to 18 carbon atoms with an average alkyl chain length of about 16 carbon atoms. For surfactant S-5, n had a value of about 3 to provide an HLB of 11.3. Surfactants S-6 and S-7 contained about 2 and 4 ethylene oxide units, respectively, to provide HLB numbers of 10.9 and 11.6. Surfactant S-8 was a hydrocarbyl polyethoxy 2-hydroxypropane sulfonate. For this surfactant, the lipophilic group corresponding to the group R in formula (1) was a mixture of alkyl groups containing from about 12 to 16 carbon atoms with an average alkyl chain length of about 14 carbon atoms. Surfactant S-8 contained about 3 units of ethylene oxide to provide an HLB of 14.1.

In one suite of experiments, viscosities were determined for aqueous solutions of the surfactants S-1 through S-8 where the salinities of the solutions, as provided by sodium chloride, were varied between 5 and 15 weight percent. The results are set forth in Table I in which the first column gives the surfactant solution salinity and the remaining columns the viscosities in centipoises as measured for the solutions containing the surfactants S-1 through S-8. In each case the surfactant was present in a concentration of 1.5 weight percent. The viscosity measurements were taken at a temperature of 128° F. with a Brookfield viscometer at a nominal shear rate of 1.7 sec$^{-1}$. The surfactant solutions were aged for about 1 day at 128° F. prior to taking the viscosity measurements. For the surfactant S-3, solution viscosities were measured twice with an interval between viscosity measurements of about 15 minutes. Both viscosity measurements are shown and the data would appear to indicate that the surfactant solution had not yet equilibrated when the viscosity measurements were taken. It is also noted that the solutions of the surfactant S-3 appeared to form two phases. The remaining surfactants formed optically clear single phase solutions throughout at least part of the salinity range over which the measurements were taken. Thus, the solutions of surfactant S-4 were optically clear throughout the range of 5 to 15 percent. Surfactants S-2 and S-5 formed optically clear solutions at salinity values of 5 to 7.5 percent and appeared to form two phases at higher salinity values. The solution characteristics of the remaining surfactants varied between those of surfactant S-4 and surfactants S-2 and S-5.

As can be seen from Table I, the surfactants S-1 through S-7 produced in each case maximum viscosities in excess of 200 centipoises at salinities ranging from 5–15 percent. Surfactant S-8 showed no thickening effect at salinities within the range of 5–10 weight percent and at a salinity of 15 percent, the viscosity of the surfactant solution was only 9 centipoises.

TABLE I

| Salinity % | Viscosity, cp. | | | | | | | |
|---|---|---|---|---|---|---|---|---|
| | S-1 | S-2 | S-3 | S-4 | S-5 | S-6 | S-7 | S-8 |
| 5 | 26.4 | 1.6 | 84–230 | 1.0 | 25 | 32 | 1.6 | 1 |
| 6.5 | 660 | 1.0 | 131–312 | 2.0 | 1450 | 700 | 4.8 | 1 |
| 7.5 | 136 | 2.0 | 125–114 | 28 | 640 | 1150 | 15 | 1 |
| 8 | 60 | 2.8 | 208–88 | 128 | 159 | 1225 | 41 | 1 |
| 9 | 7.2 | 4.0 | 164–88 | 1100 | 58 | 738 | 298 | 1 |
| 10 | 6.0 | 14.0 | 150–40 | 1060 | 9 | 158 | 950 | 1 |
| 15 | 3.0 | 1650 | 82–14 | gel | 2 | 3 | 4 | 9 |

In further experimental work, viscosities were determined for aqueous solutions of surfactant mixtures formulated from certain of the individual surfactants described above. The viscosities were measured under conditions similar to those of the previously described experimental work, i.e. at a shear rate of 1.7 sec$^{-1}$ and temperature of 128° F. The total concentration of the surfactant mixture was 1.5 weight percent. In one test, a freshly prepared mixture of equal parts of surfactants S-1 and S-3 in a 5 percent sodium chloride solution produced an optically clear solution having a viscosity of 520 centipoises and an example of a rheosynergistic behavior in that this viscosity is well above those attained by the use of either component individually. The S-1 and S-3 mixture had an average HLB of 10.5 and an average of 17 carbon atoms in the lipophilic base. In another test, a mixture of 0.6262 part of surfactant S-3 and 0.3737 part of surfactant S-8 was added to a 10 percent sodium chloride solution. This surfactant mixture had an average HLB of 11.5 and an average value of R of 16.5. The viscosity as measured after 4 hours and after 24 hours at 128° F. remained constant at 271 centipoises. The solution of this surfactant mixture also remained optically clear. Again this mixture produced a rheosynergistic behavior in that under these same conditions the single component S-3 formulation was turbid, two phase, and characterized by an erratic viscosity which decreased from 150 to 40 centipoises, while the single component S-8 solution provided no viscosity increase at this salinity. A further test was carried out employing the 0.15 part of surfactant S-8 in admixture with 0.85 part of surfactant S-6. The average HLB of the mixture was 11.3, but the average value of R was marginally low (0.15×14+0.85×16=15.3). The surfactant blend was dissolved in a 10 percent sodium chloride solution similarly as in the preceding test. In this case there was only a transient rheosynergistic effect. After 4 hours at 128° F. the viscosity was 236 centipoises, but after 24 hours, it had declined to 107 centipoises although the solution did remain optically clear throughout this period. It will be recalled that the corresponding single component S-6 solution yielded a viscosity of 158 centipoises after 24 hours, although the solution was turbid.

The present invention normally will be carried out employing operative parameters within the ranges as taught in the aforementioned application Ser. No. 859,626. The salinity of the surfactant solution is, as noted previously, within the range of 5-18 and may be adjusted as desired by the addition of monovalent metal salts or divalent metal salts. Thus salts such as sodium chloride, calcium chloride, and magnesium chloride may be present in the aqueous surfactant solution. Under similar conditions of temperature and salinity, the viscosity of the aqueous solution increases as the surfactant concentration increases. Concentrations similar to those disclosed in the aforementioned application Ser. No. 859,626 may be employed in carrying out this invention although in some cases a somewhat lower concentration may be used because of the greater viscosity yield achieved through the use of the surfactant mixtures as contrasted with the individual surfactant components. The viscosity of the aqueous solution of surfactant mixtures should be equal to or greater than the viscosity of the reservoir oil for mobility control purposes. The concentration of the total surfactant mixture normally will range from about 0.1 to 1.5 weight percent. The relationship between temperature and solution viscosity can generally be expected to be about the same as the temperature-viscosity relationship for the single component systems. Thus, the reservoir temperature should be at least 90° F. with a preferred application of the invention being in reservoirs having temperatures within the range of 100°-175° F.

Preferably, the average HLB value of the surfactant mixture is within the range of 10-12. Also in a preferred embodiment of the invention the lipophilic base of the mixture will be similar to that as taught in the aforementioned application Ser. No. 859,626 for the individual components. Thus, the average aliphatic hydrocarbon group R in formula (1) will have an average from 16 to 18 carbon atoms. The thickened aqueous liquid containing the surfactant mixture may be the sole surfactant slug employed in the oil recovery operation or it may be employed in conjunction with another surfactant slug. Also, the thickened aqueous surfactant solution may be relatively constant throughout, or a portion of the slug may be graded in viscosity. For a further description of these and other techniques which may be employed in carrying out the present invention, reference is made to the disclosure of the aforementioned application Ser. No. 859,626 which is incorporated herein by reference.

The present invention may be carried out utilizing injection and production systems as defined by any suitable arrangement of wells. One well arrangement commonly used in waterflooding operations and suitable for use in carrying out the present invention is an integrated five-spot pattern of the type illustrated in the aforementioned patent to Savins et al. Other well arrangements may be used in carrying out the present invention, examples of which are set forth in the Savins et al patent. By the term "pore volume" as used herein is meant that volume of the poriton of the formation underlying the well pattern employed as described in greater detail in the Savins et al patent.

The thickened aqueous surfactant solution may be injected in any suitable amount depending upon the conditions encountered in a particular reservoir and the concentration of the ether-linked surfactant mixture. The thickened aqueous surfactant solution usually will be injected in an amount of at least 0.1 pore volume to provide for effective mobility control. Usually the aqueous solution of the ether-linked sulfonate will be employed in an amount within the range of 0.1 to 0.5 pore volume. Where the thickened surfactant solution is preceded by the low viscosity surfactant slug, the low viscosity surfactant slug usually will be injected in an amount within the range of 0.05 to 0.2 pore volume. Subsequent to the injection of the thickened surfactant slug, an aqueous driving fluid is then injected through the injection system to displace the fluids through the reservoir to the production system. The driving fluid may be any water which is locally available and not incompatible with the formation and may be injected in such amounts as is necessary to carry the process to its completion.

I claim:

1. In a method for the recovery of oil from a subterranean oil reservoir having a temperature of at least 90° F. and penetrated by spaced injection and production systems wherein an aqueous fluid is introduced into said reservoir via said injection system to displace oil to said production system, the improvement comprising:

employing as at least a portion of the fluid introduced into said injection system a thickened aqueous liquid having a salinity within the range of 5-18 weight percent and containing a mixture of at least two water-soluble sulfonated polyethoxylated aliphatic alcohols of different HLB values and whereby said mixture increases the viscosity of said aqueous liquid to a value greater than the viscosity of said aqueous liquid containing an equal amount of either of said sulfonated polyethoxylated aliphatic alcohols alone, said mixture having an average HLB within the range of 10.0-14 and said sulfonated polyethoxylated aliphatic alcohols being characterized by the formula:

$$R(OC_2H_4)_nOC_3H_6SO_3^{-M+} \qquad (I)$$

wherein R is an aliphatic hydrocarbon group having an average of from 16 to 20 carbon atoms,
n is at least 2, and
M is an alkali metal, ammonium, or substituted ammonium ion.

2. The method of claim 1 wherein said mixture of sulfonated polyethoyxlated aliphatic alcohol surfactants has an average HLB within the range of 10.0-12.0.

3. The method of claim 1 wherein R has an average of from 16 to 18 carbon atoms.

4. The method of claim 1, wherein said mixture consists of equal parts of two surfactants of formula (I), the first of said surfactants having an HLB of 10.9 and a formula according to formula (I) whereby R is a hexadecyl group and n has a value of 2, the second of said surfactants having an HLB of 10.0 and a formula according to formula (I) whereby R is an octadecyl group and n has a value of about 2.

* * * * *